(12) United States Patent
Li et al.

(10) Patent No.: US 10,505,381 B2
(45) Date of Patent: Dec. 10, 2019

(54) ELECTRIC ENERGY DISPATCH METHOD AND APPARATUS, AND POWER MANAGEMENT METHOD AND APPARATUS

(71) Applicant: Huawei Technologies Co., Ltd., Shenzhen (CN)

(72) Inventors: Yingtao Li, Shenzhen (CN); Kangmin Huang, Shenzhen (CN); Pinghua Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 380 days.

(21) Appl. No.: 15/356,237

(22) Filed: Nov. 18, 2016

(65) Prior Publication Data

US 2017/0070069 A1 Mar. 9, 2017

Related U.S. Application Data

(63) Continuation of application No. PCT/CN2015/070504, filed on Jan. 12, 2015.

(30) Foreign Application Priority Data

May 21, 2014 (CN) .......................... 2014 1 0216311

(51) Int. Cl.
*H02J 7/00* (2006.01)
(52) U.S. Cl.
CPC ............ *H02J 7/0044* (2013.01); *H02J 7/007* (2013.01); *H02J 7/0021* (2013.01)
(58) Field of Classification Search
CPC ........... H02J 7/0044; H02J 7/0021; H02J 3/32
(Continued)

(56) References Cited

U.S. PATENT DOCUMENTS 7,957,846 B2 6/2011 Hakim et al.
2008/0114499 A1 5/2008 Hakim et al.
(Continued)

FOREIGN PATENT DOCUMENTS

CN 101728839 A 6/2010
CN 101814760 A 8/2010
(Continued)

OTHER PUBLICATIONS

Giuntoli, M. et al.; "Optimized Thermal and Electrical Scheduling of a Large Scale Virtual Power Plant in the Presence of Energy Storages"; IEEE Transactions on Smart Grid, vol. 4, No. 2, Jun. 2013; pp. 942-955.
(Continued)

*Primary Examiner* — Edward Tso
*Assistant Examiner* — Aaron Piggush
(74) *Attorney, Agent, or Firm* — Slater Matsil, LLP

(57) ABSTRACT

An electric energy dispatch method and apparatus, and a power management method and apparatus are disclosed. The method includes: determining, by an electric energy dispatch apparatus, a first time period and a second time period and sending, by the electric energy dispatch apparatus, first indication information to a base station. The first indication information is used to control an energy storage battery of the base station to store electric energy from a power grid connected to the base station within the first time period. The method further includes sending, by the electric energy dispatch apparatus, second indication information to the base station. The second indication information is used to control the energy storage battery of the base station to perform electric energy compensation for the power grid connected to the base station within the second time period.

22 Claims, 10 Drawing Sheets

(58) Field of Classification Search
USPC ............ 320/103, 109, 115; 307/52; 700/295
See application file for complete search history.

(56) References Cited

U.S. PATENT DOCUMENTS

| | | | |
|---|---|---|---|
| 2011/0101779 A1 | 5/2011 | Patel et al. | |
| 2011/0137481 A1 | 6/2011 | Manz et al. | |
| 2011/0199052 A1* | 8/2011 | Sun | H01M 10/44 |
| | | | 320/128 |
| 2011/0266867 A1 | 11/2011 | Schindler et al. | |
| 2012/0059527 A1* | 3/2012 | Beaston | H01M 10/441 |
| | | | 700/295 |
| 2013/0043738 A1 | 2/2013 | Park et al. | |
| 2014/0049109 A1* | 2/2014 | Kearns | H02J 3/00 |
| | | | 307/52 |
| 2016/0020613 A1 | 1/2016 | Kimura et al. | |

FOREIGN PATENT DOCUMENTS

| | | |
|---|---|---|
| CN | 101860944 A | 10/2010 |
| CN | 102025182 A | 4/2011 |
| CN | 102055203 A | 5/2011 |
| CN | 102104251 A | 6/2011 |
| CN | 102290841 A | 12/2011 |
| CN | 102427249 A | 4/2012 |
| CN | 102427272 A | 4/2012 |
| CN | 102893554 A | 1/2013 |
| CN | 103064490 A | 4/2013 |
| CN | 103248038 A | 8/2013 |
| EP | 2816699 A1 | 12/2014 |
| JP | S57116551 A | 7/1982 |
| JP | 2000224769 A | 8/2000 |
| JP | 2007014066 A | 1/2007 |
| JP | 2007336796 A | 12/2007 |
| JP | 2013042627 A | 2/2013 |
| JP | 2013143838 A | 7/2013 |
| JP | 2013169089 A | 8/2013 |
| WO | 2013095478 A1 | 6/2013 |
| WO | 2013122079 A1 | 8/2013 |
| WO | 2014019607 A1 | 2/2014 |

OTHER PUBLICATIONS

Khanabadi, M. et al.; "Day Ahead Scheduling of Distribution System with Distributed Energy Resources Considering Demand Response and Energy Storage"; Department of Electrical and Computer Engineering, University of North Carolina at Charlotte, Charlotte, NC; 2013, 6 pages.

* cited by examiner

ELECTRIC ENERGY DISPATCH METHOD AND APPARATUS, AND POWER MANAGEMENT METHOD AND APPARATUS

CROSS-REFERENCE TO RELATED APPLICATIONS

This application is a continuation of International Application No. PCT/CN2015/070504, filed on Jan. 12, 2015, which claims priority to Chinese Patent Application No. 201410216311.1, filed on May 21, 2014. The disclosures of the aforementioned applications are hereby incorporated by reference in their entireties.

TECHNICAL FIELD

The present invention relates to the field of mobile communications, and in particular, to an electric energy dispatch method and apparatus, and a power management method and apparatus.

BACKGROUND

In an existing power grid system, when power supply of a power grid is at the peak of electricity usage, electricity consumption from external load increases continuously, which affects load of the power grid, and therefore has great impact on operation of the power grid. When power supply of the power grid is at a low level of electricity usage, there is an abundant amount of electric energy in the power grid, and resources of the abundant amount of electric energy are not utilized, resulting in waste.

A solution in the prior art is: configuring a large-scale energy storage apparatus for a power generation system. When the power grid is at the peak of power supply, the energy storage apparatus performs electric energy compensation for a power grid system. When the power grid is at a low level of power supply, the energy storage apparatus transfers and stores remaining electric energy in the power grid system.

However, independently configuring a large-scale energy storage apparatus often needs large investment. Moreover, the energy storage apparatus generally transfers and stores electric energy in the power grid system in a pumped storage manner, a mechanical energy storage manner, or another manner, and conversion efficiency of these electric energy transfer manners is relatively low.

SUMMARY

Embodiments of the present invention provide an electric energy dispatch method and apparatus, and a power management method and apparatus, so that an energy storage battery in a base station is used as an energy storage container of a power grid, and costs are relatively low and electric energy transfer efficiency is relatively high.

A first aspect of the embodiments of the present invention provides an electric energy dispatch method. The method includes determining, by an electric energy dispatch apparatus, a first time period and a second time period. First indication information is sent by the electric energy dispatch apparatus to a base station. The first indication information includes information to control an energy storage battery of the base station to store electric energy from a power grid connected to the base station within the first time period. Second indication information is sent by the electric energy dispatch apparatus to the base station. The second indication information includes information to control the energy storage battery of the base station to perform electric energy compensation for the power grid connected to the base station within the second time period.

With reference to the first aspect of the embodiments of the present invention, in a first implementation manner of the first aspect of the embodiments of the present invention, the determining includes: acquiring, by the electric energy dispatch apparatus, predicted load data of the power grid from the power grid; determining, by the electric energy dispatch apparatus, a low-load time period and a peak-load time period of the power grid according to the predicted load data of the power grid; and determining, by the electric energy dispatch apparatus, the low-load time period of the power grid as the first time period, and determining the peak-load time period of the power grid as the second time period.

With reference to the first aspect of the embodiments of the present invention, in a second implementation manner of the first aspect of the embodiments of the present invention, the determining a first time period and a second time period includes receiving and storing, by the electric energy dispatch apparatus, presettings of the first time period and the second time period.

With reference to the first aspect of the embodiments of the present invention, in a third implementation manner of the first aspect of the embodiments of the present invention, the method further includes detecting, by the electric energy control apparatus, a status of an energy storage battery of each of the at least one base station. The sending, by the electric energy dispatch apparatus, first indication information includes when a status of the energy storage battery of the base station before the first time period satisfies a first preset condition, sending, by the electric energy dispatch apparatus, the first indication information to the base station. The sending, by the electric energy dispatch apparatus, second indication information includes when a status of the energy storage battery of the base station before the second time period satisfies a second preset condition, sending, by the electric energy dispatch apparatus, the second indication information to the base station.

With reference to the third implementation manner of the first aspect of the embodiments of the present invention, in a fourth implementation manner of the first aspect of the embodiments of the present invention, when an amount of electric charge of the energy storage battery of the base station before the first time period is less than a first preset value, it is determined that the status of the energy storage battery of the base station before the first time period satisfies the first preset condition.

With reference to the third implementation manner of the first aspect of the embodiments of the present invention, in a fifth implementation manner of the first aspect of the embodiments of the present invention, when an amount of electric charge of the energy storage battery of the base station before the second time period is greater than a second preset value, it is determined that the status of the energy storage battery of the base station before the second time period satisfies the second preset condition.

With reference to the first aspect of the embodiments of the present invention, in a sixth implementation manner of the first aspect of the embodiments of the present invention, after the sending second indication information to the base station, the method further includes when a status of the energy storage battery of the base station satisfies a third preset condition, sending, by the electric energy dispatch apparatus, third indication information to the base station, where the third indication information is used to control the energy storage battery of the base station to stop performing electric energy compensation for the power grid.

With reference to the sixth implementation manner of the first aspect of the embodiments of the present invention, in a seventh implementation manner of the first aspect of the embodiments of the present invention, the method further includes: acquiring, by the electric energy dispatch apparatus, an amount of electric charge and a health coefficient of the energy storage battery of the base station, a service idleness coefficient of the base station, and a stability coefficient of the power grid connected to the base station; calculating, by the electric energy dispatch apparatus, a discharge depth threshold of the energy storage battery of the base station according to the amount of electric charge and the health coefficient of the energy storage battery of the base station, the service idleness coefficient of the base station, and the stability coefficient of the power grid connected to the base station; and when a discharge depth of an energy storage battery of each of the base stations reaches the discharge depth threshold, determining, by the electric energy dispatch apparatus, that the status of the energy storage battery of the base station satisfies the third preset condition.

A second aspect of the embodiments of the present invention provides an electric energy dispatch apparatus including a first determining module, configured to determine a first time period and a second time period. A first sending module is configured to send first indication information to a base station. The first indication information includes information to control an energy storage battery of the base station to store electric energy from a power grid connected to the base station within the first time period. A second sending module is configured to send second indication information to the base station. The second indication information includes information to control the energy storage battery of the base station to perform electric energy compensation for the power grid connected to the base station within the second time period.

With reference to the second aspect of the embodiments of the present invention, in a first implementation manner of the second aspect of the embodiments of the present invention, the first determining module includes a first acquiring unit, configured to acquire predicted load data of the power grid from the power grid; a first determining unit, configured to determine a low-load time period and a peak-load time period of the power grid according to the predicted load data of the power grid; and a second determining unit, configured to determine the low-load time period of the power grid as the first time period, and determine the peak-load time period of the power grid as the second time period.

With reference to the second aspect of the embodiments of the present invention, in a second implementation manner of the second aspect of the embodiments of the present invention, the first determining module includes a receiving unit, configured to receive and store presettings of the first time period and the second time period.

With reference to the second aspect of the embodiments of the present invention, in a third implementation manner of the second aspect of the embodiments of the present invention, the electric energy dispatch apparatus further includes a detection module, configured to detect a status of an energy storage battery of each of the at least one base station, where the first sending module is specifically configured to: when a status of the energy storage battery of the base station before the first time period satisfies a first preset condition, send the first indication information to the base station. The second sending module is specifically configured to: when a status of the energy storage battery of the base station before the second time period satisfies a second preset condition, send the second indication information to the base station.

With reference to the third implementation manner of the second aspect of the embodiments of the present invention, in a fourth implementation manner of the second aspect of the embodiments of the present invention, the first sending module further includes a third determining unit, configured to: when an amount of electric charge of the energy storage battery of the base station before the first time period is less than a first preset value, determine that the status of the energy storage battery of the base station before the first time period satisfies the first preset condition.

With reference to the third implementation manner of the second aspect of the embodiments of the present invention, in a fifth implementation manner of the second aspect of the embodiments of the present invention, the second sending module further includes a fourth determining unit, configured to: when an amount of electric charge of the energy storage battery of the base station before the second time period is greater than a second preset value, determine that the status of the energy storage battery of the base station before the second time period satisfies the second preset condition.

With reference to the second aspect of the embodiments of the present invention, in a sixth implementation manner of the second aspect of the embodiments of the present invention, the electric energy dispatch apparatus further includes a third sending module, configured to: after the second sending module sends the second indication information to the base station, send third indication information to the base station when a status of the energy storage battery of the base station satisfies a third preset condition, where the third indication information is used to control the energy storage battery of the base station to stop performing electric energy compensation for the power grid.

With reference to the sixth implementation manner of the second aspect of the embodiments of the present invention, in a seventh implementation manner of the second aspect of the embodiments of the present invention, the electric energy dispatch apparatus further includes an acquiring module, configured to acquire an amount of electric charge and a health coefficient of the energy storage battery of the base station, a service idleness coefficient of the base station, and a stability coefficient of the power grid connected to the base station. A calculation module is configured to calculate a discharge depth threshold of the energy storage battery of the base station according to the amount of electric charge and the health coefficient of the energy storage battery of the base station, the service idleness coefficient of the base station, and the stability coefficient of the power grid connected to the base station. A second determining module is configured to: when a discharge depth of an energy storage battery of each of the base stations reaches the discharge depth threshold, determine, by the electric energy dispatch apparatus, that the status of the energy storage battery of the base station satisfies the third preset condition.

A third aspect of the embodiments of the present invention provides a power management method, including: receiving, by a power management apparatus, first indication information and second indication information from an electric energy dispatch apparatus; controlling, by the power management apparatus according to the first indication information, an energy storage battery of the first base station to store electric energy within a first time period from a power grid connected to the first base station; and controlling, by the power management apparatus according to the second indication information, the energy storage battery of the first base station to perform electric energy compensation within a second time period for the power grid connected to the first base station.

With reference to the third aspect of the embodiments of the present invention, in a first implementation manner of the third aspect of the embodiments of the present invention, the method further includes monitoring in real time, by the power management apparatus, load power of the first base station, a related parameter of the power grid connected to the first base station, and a related parameter of the energy storage battery of the first base station, and sending the load power of the first base station, the related parameter of the power grid connected to the first base station, and the related parameter of the energy storage battery of the first base station to the electric energy dispatch apparatus.

With reference to the third aspect of the embodiments of the present invention, in a second implementation manner of the third aspect of the embodiments of the present invention, after the receiving, by a power management apparatus, second indication information from an electric energy dispatch apparatus, the method further includes further receiving, by the power management apparatus, third indication information from the electric energy dispatch apparatus, and controlling, by the power management apparatus according to the third indication information, the energy storage battery of the first base station to stop performing electric energy compensation for the power grid.

A fourth aspect of the embodiments of the present invention provides a power management apparatus, including a first receiving module configured to receive first indication information and second indication information from an electric energy dispatch apparatus. A first control module is configured to control, according to the first indication information, an energy storage battery of the first base station to store electric energy within a first time period from a power grid connected to the first base station. A second control module is configured to control, according to the second indication information, the energy storage battery of the first base station to perform electric energy compensation within a second time period for the power grid connected to the first base station.

With reference to the fourth aspect of the embodiments of the present invention, in a first implementation manner of the fourth aspect of the embodiments of the present invention, the power management apparatus further includes a monitoring module configured to monitor in real time load power of the first base station, a related parameter of the power grid connected to the first base station, and a related parameter of the energy storage battery of the first base station, and send the load power of the first base station, the related parameter of the power grid connected to the first base station, and the related parameter of the energy storage battery of the first base station to the electric energy dispatch apparatus.

With reference to the fourth aspect of the embodiments of the present invention, in a second implementation manner of the fourth aspect of the embodiments of the present invention, the power management apparatus further includes a second receiving module configured to receive third indication information from the electric energy dispatch apparatus. A third control module is configured to control, according to the third indication information, the energy storage battery of the first base station to stop performing electric energy compensation for the power grid.

It can be seen from the foregoing technical solutions that the embodiments of the present invention have the following advantages:

In the embodiments of the present invention, an electric energy dispatch apparatus determines both a first time period and a second time period, uses an energy storage battery of at least one base station connected to the electric energy dispatch apparatus as an energy storage container within the first time period, transfers and stores electric energy of a power grid to the energy storage container, and uses the energy storage container to perform electric energy compensation within the second time period for the power grid. Because each existing base station is equipped with an energy storage battery, using the energy storage battery of each base station as an energy storage apparatus of a power grid does not need extra investment, and utilization value of the energy storage battery of the base station is improved. Moreover, efficiency of electric energy transfer between the power grid and the energy storage battery of each base station is relatively high, which avoids waste of electric energy due to relatively great loss of electric energy during a transfer process.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Embodiments of the present invention provide an electric energy dispatch method and apparatus, and a power management method and apparatus, so that an energy storage battery in a base station is used as an energy storage container of a power grid, and costs are relatively low and electric energy transfer efficiency is relatively high.

To make persons skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, product, or device.

Figure 1:
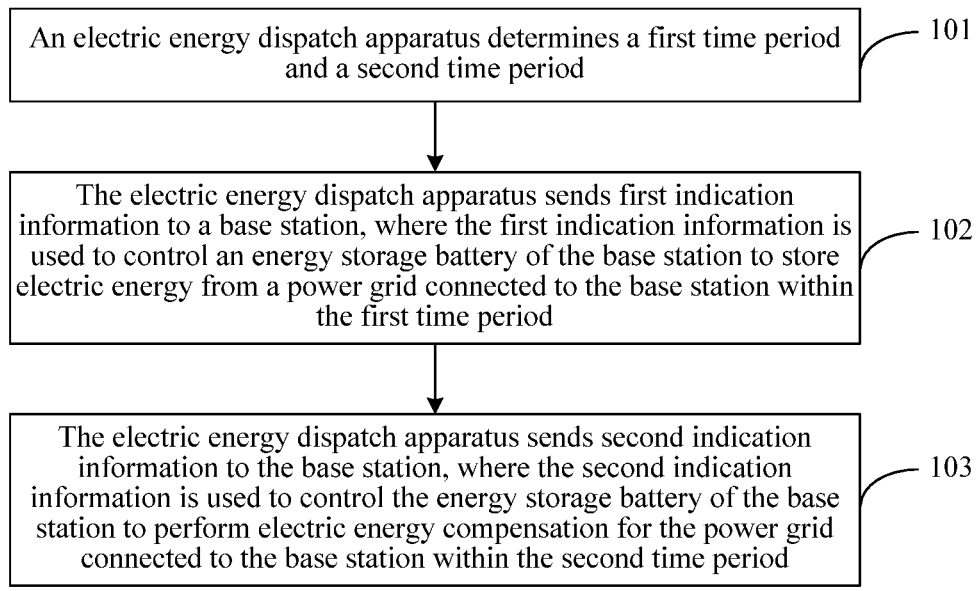
FIG. 1 is a flowchart of an embodiment of an electric energy dispatch method according to the present invention.

Referring to FIG. 1, an electric energy dispatch method in an embodiment of the present invention includes the following.

101: An electric energy dispatch apparatus determines a first time period and a second time period.

In a communications system, each base station is equipped with an energy storage battery, where the energy storage battery is used to: supply power to the base station during power outage, so as to ensure normal running of the base station, and when power is normally supplied to the base station, store electric energy from a power grid connected to the base station, so as to supply electric energy to the base station during next power outage.

In an electric power system, the power grid transmits and distributes, to each electricity load, electric energy generated through conversion by a power generation station. Electric energy generated through conversion by a power generation station per unit time is fixed, while electricity consumption of each electricity load within different time periods is different. Within some time periods, electricity consumption of each electricity load is relatively large, and even exceeds an amount of electricity that can be supplied by the power grid. A time period within which total electricity consumption exceeds a particular value (which is referred to as an upper limit) is referred to as a peak-load time period of the power grid. Within some time periods, electricity consumption of each electricity load is relatively small, there is a large amount of electricity remaining in the power grid. A time period within which total electricity consumption is lower than a particular value (which is referred to as a lower limit) is referred to as a low-load time period of the power grid. It should be noted that, in different areas, a peak-load time period and a low-load time period of a power grid are not necessarily the same, and an upper limit and a lower limit that are used for defining that the power grid reaches the peak-load time period and the low-load time period are not necessarily the same.

In this embodiment, the electric energy dispatch apparatus manages a reserve battery of the at least one base station, to control the reserve battery of each of the base stations to store electric energy from the power grid and to perform electric energy compensation for the power grid. The first time period is a time period within which the electric energy dispatch apparatus controls the energy storage battery of each base station to store electric energy from a power grid connected to the base station, and the second time period is a time period within which the electric energy dispatch apparatus controls the energy storage battery of each base station to perform electric energy compensation for the power grid connected to the base station.

Within the low-load time period, because there is a large amount of electricity remaining in the power grid, to utilize resources more fully, in this embodiment, preferably, the first time period at least partially coincides with the low-load time period. Within the peak-load time period, the power grid is loaded with relatively large pressure, and to avoid bringing more pressure to the power grid, in this embodiment, preferably, the second time period at least partially coincides with the peak-load time period. Certainly, the foregoing description is merely an example, and is not limited. The electric energy dispatch apparatus may determine other time periods as the first time period and the second time period according to an actual specific situation.

102: The electric energy dispatch apparatus sends first indication information to at least one base station, where the first indication information is used to control an energy storage battery of the base station to store electric energy from a power grid connected to the base station within the first time period.

The electric energy dispatch apparatus sends the first indication information to the base station, to control the energy storage battery of the base station to store electric energy within the first time period from the power grid connected to the base station. The energy storage battery of the base station that receives the first indication information starts to store electric energy.

103: The electric energy dispatch apparatus sends second indication information to the at least one base station, where the second indication information is used to control the energy storage battery of the base station to perform electric energy compensation for the power grid connected to the base station within the second time period.

The electric energy dispatch apparatus sends the second indication information to the base station, to control the energy storage battery of the base station to perform electric energy compensation for the power grid connected to the base station within the second time period. The energy storage battery of the base station that receives the second indication information starts to perform electric energy compensation for the power grid.

In this embodiment of the present invention, an electric energy dispatch apparatus determines both a first time period and a second time period, uses an energy storage battery of at least one base station connected to the electric energy dispatch apparatus as an energy storage container within the first time period, transfers and stores electric energy of a power grid to the energy storage container, and uses the energy storage container to perform electric energy compensation within the second time period for the power grid. Because each existing base station is equipped with an energy storage battery, using the energy storage battery of each base station as an energy storage apparatus of a power grid does not need extra investment, and utilization value of the energy storage battery of the base station is improved.

Moreover, efficiency of electric energy transfer between the power grid and the energy storage battery of each base station is relatively high, which avoids waste of electric energy due to relatively great loss of electric energy during a transfer process.

Figure 2:
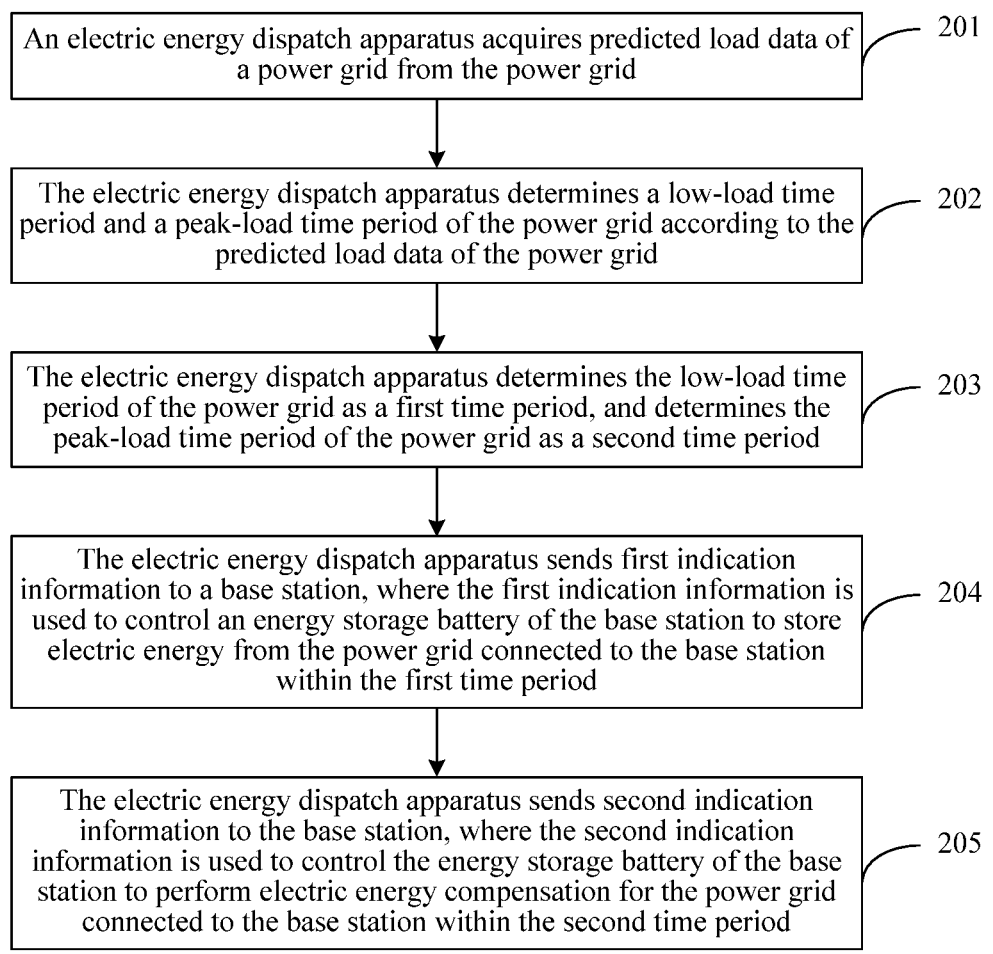
FIG. 2 is a flowchart of another embodiment of an electric energy dispatch method according to the present invention.

In the foregoing embodiment, the electric energy dispatch apparatus needs to determine the first time period and the second time period. In actual application, the electric energy dispatch apparatus may determine the first time period and the second time period in multiple manners, and an electric energy dispatch method in an embodiment of the present invention is described below. Referring to FIG. 2, an electric energy dispatch method in another embodiment of the present invention includes the following.

201: The electric energy dispatch apparatus acquires predicted load data of the power grid from the power grid.

The electric energy dispatch apparatus may acquire the predicted load data of the power grid from a power grid dispatch system or a power grid server of the power grid. Certainly, in actual application, the electric energy dispatch apparatus may acquire the predicted load data of the power grid from another place, which is not limited herein. Predicted load data is load prediction made for a future time period according to past load changes of the power grid, and reflects a rule about how load of the power grid changes along with time within a future time period. Specifically, the predicted load data acquired by the electric energy dispatch apparatus may include daily predicted load data, monthly predicted load data, quarterly predicted load data, or annually predicted data.

Because the predicted load data of the power grid is updated continuously, preferably, the electric energy dispatch apparatus re-acquires the predicted load data of the power grid at preset time intervals or at a preset time point, to update the acquired predicted load data. Certainly, because generally the rule about how load of the power grid changes along with time does not fluctuate greatly, in actual application, the electric energy dispatch apparatus may not update the predicted load data, which is not limited herein.

202: The electric energy dispatch apparatus determines a low-load time period and a peak-load time period of the power grid according to the predicted load data of the power grid.

Because the predicted load data of the power grid reflects the rule about how load of the power grid changes along with time within a future time period, the electric energy dispatch apparatus may determine the low-load time period and the peak-load time period of the power grid according to the rule. In actual application, the power grid already defines that a period within which load of the power grid is lower than a particular value is the low-load time period, and a period within which load of the power grid is higher than a particular value is the peak-load time period. The electric energy dispatch apparatus may determine the low-load time period and the peak-load time period of the power grid directly according to defining by the power grid. Alternatively, the electric energy dispatch apparatus may define that a period within which load of the power grid is lower than a particular value is the low-load time period, and a period within which load of the power grid is higher than a particular value is the peak-load time period, and determine the low-load time period and the peak-load time period of the power grid according to the defining by the electric energy dispatch apparatus.

203: The electric energy dispatch apparatus determines the low-load time period of the power grid as the first time period, and determines the peak-load time period of the power grid as the second time period.

After determining the low-load time period and the peak-load time period, the electric energy dispatch apparatus determines the low-load time period as the first time period to control the energy storage battery of the base station to store electric energy from the power grid, and determines the peak-load time period as the second time period to control the energy storage battery of the base station to perform electric energy compensation for the power grid.

204: The electric energy dispatch apparatus sends first indication information to the base station, where the first indication information is used to control the energy storage battery of the base station to store electric energy within the first time period from the power grid connected to the base station.

For a detailed description, refer to the description of step 102 in the embodiment shown in FIG. 1.

205: The electric energy dispatch apparatus sends second indication information to the base station, where the second indication information is used to control the energy storage battery of the base station to perform electric energy compensation for the power grid connected to the base station within the second time period.

For a detailed description, refer to the description of step 103 in the embodiment shown in FIG. 1.

In this embodiment of the present invention, an electric energy dispatch apparatus acquires predicted load data of a power grid from the power grid, and determines, according to the data, that a time period within which an energy storage battery of each base station stores electric energy from the power grid is a low-load time period of the power grid, and that a time period within which the energy storage battery of each base station performs electric energy compensation for the power grid is a peak-load time period of the power grid. In this way, the electric energy dispatch apparatus uses an energy storage battery of at least one base station connected to the electric energy dispatch apparatus as an energy storage container, transfers and stores electric energy of the power grid to the energy storage container within the low-load time period of the power grid, so that the electric energy stored in the energy storage container can be used within the peak-load time period of the power grid, which can reduce pressure of the power grid within the peak-load time period and fully utilize electric energy resources within the low-load time period of the power grid.

In this embodiment, the electric energy dispatch apparatus acquires the first time period and the second time period by means of step 201 to step 203. In actual application, in the predicted load data of the power grid, a rule about how load of the power grid changes along with time is very obvious, and remains stable for a very long time period. Therefore, alternatively, the electric energy dispatch apparatus may not acquire the first time period and the second time period by means of step 201 to step 203, but receives and stores presettings of the first time period and the second time period.

Specifically, for example, in a work day, 9:00 to 12:00 in the morning and 14:00 to 18:00 in the afternoon are usually peak-load time periods of the power grid, and 22:00 to 6:00 in the evening is usually the low-load time period of the power grid. Therefore, it may be preset in the electric energy dispatch apparatus that the first time period is 22:00 to 6:00 in the evening in a work day, and the second time period is 9:00 to 12:00 in the morning and/or 14:00 to 18:00 in the afternoon in a work day. Certainly, the foregoing description of the first time period and the second time period is merely an example, and is not limited.

Even, in actual application, the first time period and the second time period may not be preset according to the low-load time period and the peak-load time period of the power grid, but the first time period and the second time period are preset according to another actual requirement, which is not limited herein.

The electric energy dispatch apparatus receives and stores presettings of the first time period and the second time period, and invokes the first time period and the second time period from a storage location when needed.

Figure 3:
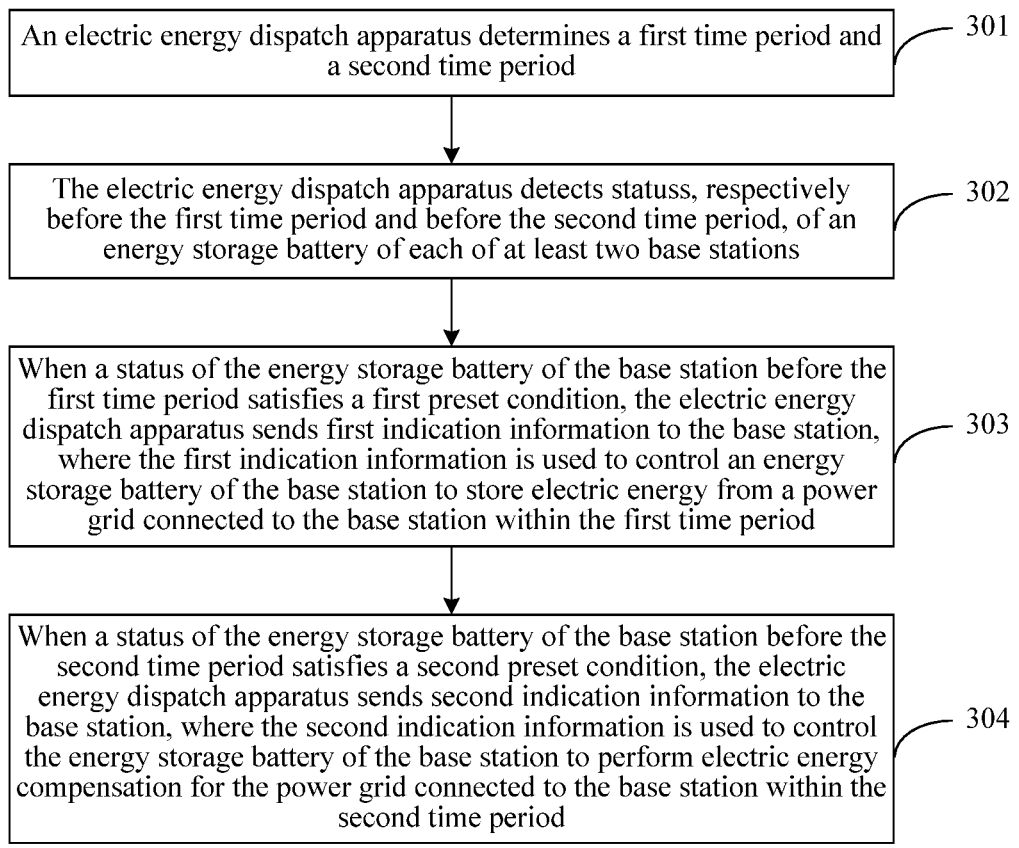
FIG. 3 is a flowchart of another embodiment of an electric energy dispatch method according to the present invention.

In actual application, when the electric energy dispatch apparatus controls the energy storage battery of each base station to store electric energy from the power grid or perform electric energy compensation for the power grid, a status of the energy storage battery of each base station may be unfavorable for storing electric energy from the power grid or performing electric energy compensation for the power grid. Therefore, preferably, in the embodiments of the present invention, the status of the energy storage battery of each base station is also detected. An electric energy dispatch method in an embodiment of the present invention is described below. Referring to FIG. 3, an electric energy dispatch method in another embodiment of the present invention includes the following.

301: An electric energy dispatch apparatus determines a first time period and a second time period.

For a detailed description, refer to the description of step 101 in the embodiment shown in FIG. 1.

302: The electric energy dispatch apparatus detects states, respectively before the first time period and before the second time period, of an energy storage battery of each of at least one base station.

In actual application, because a battery cannot arbitrarily store electric energy and perform electric energy compensation for a power grid at any time, for example, when a battery level is zero, the battery cannot perform electric energy compensation for the power grid, and when a battery level is full, the battery cannot store electric energy. Alternatively, in actual application, storing electric energy and performing electric energy compensation for the power grid by the battery needs to satisfy a particular condition in a different application case.

Therefore, in this embodiment, after determining the first time period or the second time period, and before controlling each of the managed base station to store electric energy within the first time period or to perform electric energy compensation within the second time period for the power grid, the electric energy dispatch apparatus further needs to detect states, respectively before the first time period and before the second time period, of the energy storage battery of each base station, and then determines, according to the status of the energy storage battery, whether to store electric energy from the power grid or to perform electric energy compensation for the power grid. Because the status of the energy storage battery is relatively stable within a particular time period, the electric energy dispatch apparatus may specifically detect the energy storage battery within a preset time before the first time period or the second time period, where a specific value of the preset time is not limited.

303: When a status of the energy storage battery of the base station before the first time period satisfies a first preset condition, the electric energy dispatch apparatus sends first indication information to the base station, where the first indication information is used to control the energy storage battery of the base station to store electric energy from a power grid connected to the base station within the first time period.

There may be multiple manners of setting the first preset condition. For example, when a battery health coefficient of the energy storage battery of the base station is greater than a third preset value, the status of the energy storage battery satisfies the first preset condition. Alternatively, when an amount of electric charge of the energy storage battery of the base station is less than a first preset value, the status of the energy storage battery satisfies the first preset condition. Certainly, the foregoing description of the first preset condition is merely an example, and is not limited.

After determining that the status of the energy storage battery of the base station before the first time period satisfies the first preset condition, the electric energy dispatch apparatus sends the first indication information to the base station, to control the energy storage battery of the base station to store electric energy within the first time period from the power grid connected to the base station. The energy storage battery of the base station that receives the first indication information starts to store electric energy.

304: When a status of the energy storage battery of the base station before the second time period satisfies a second preset condition, the electric energy dispatch apparatus sends second indication information to the base station, where the second indication information is used to control the energy storage battery of the base station to perform electric energy compensation for the power grid connected to the base station within the second time period.

There may be multiple manners of setting the second preset condition. For example, when a battery health coefficient of the energy storage battery of the base station is greater than a fourth preset value, the status of the energy storage battery satisfies the second preset condition. Alternatively, when an amount of electric charge of the energy storage battery of the base station is greater than a second preset value, the status of the energy storage battery satisfies the second preset condition. Certainly, the foregoing description of the second preset condition is merely an example, and is not limited.

After determining that the status of the energy storage battery of the base station before the second time period satisfies the second preset condition, the electric energy dispatch apparatus sends the second indication information to the base station, to control the energy storage battery of the base station to perform electric energy compensation for the power grid connected to the base station within the second time period. The energy storage battery of the base station that receives the second indication information starts to perform electric energy compensation for the power grid.

In this embodiment of the present invention, an electric energy dispatch apparatus first detects a status of an energy storage battery of each base station, and when states of the energy storage battery of each base station before a first time period and a second time period respectively satisfy preset conditions, controls each energy storage battery to store electric energy and release electric energy, thereby ensuring safety working of the energy storage battery of each base station.

Figure 4:
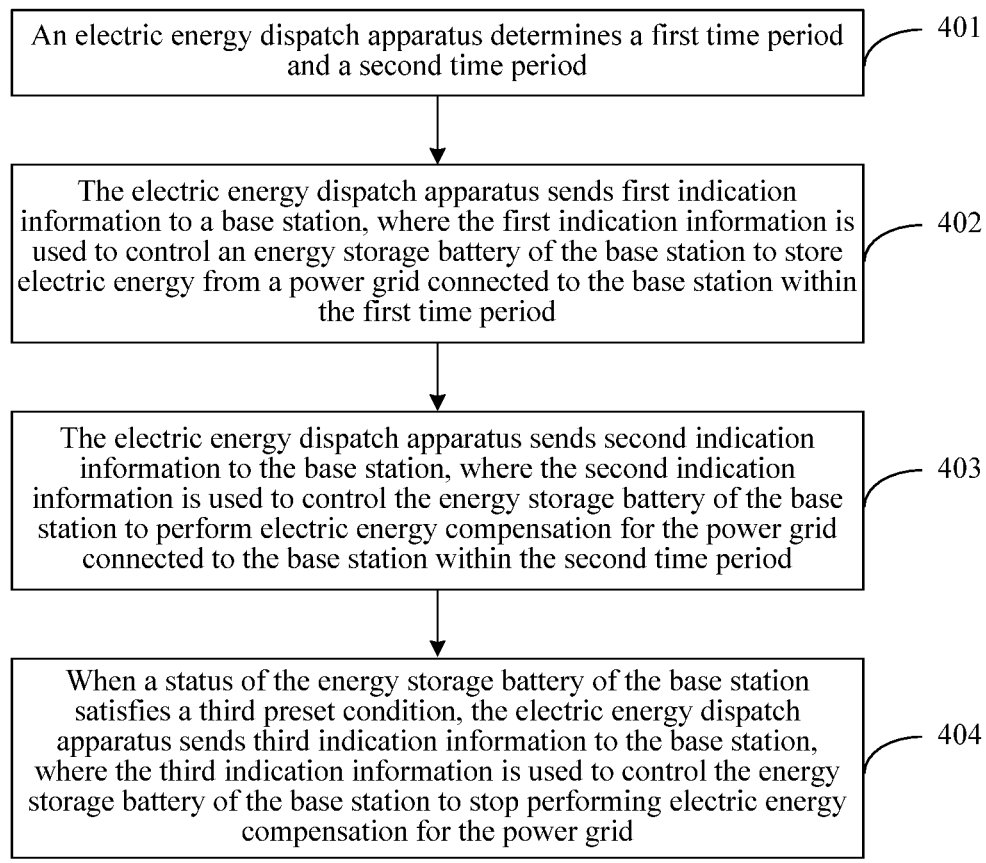
FIG. 4 is a flowchart of another embodiment of an electric energy dispatch method according to the present invention.

In the foregoing embodiments, the electric energy dispatch apparatus sends second indication information to the base station, so as to control an energy storage battery of the base station to perform electric energy compensation within the second time period for the base station for the power grid. In actual application, to ensure that an energy storage battery of each base station can provide assurance to the base station during power outage, when the energy storage battery of each base station performs electric energy compensation within the second time period for the power grid, the energy storage battery does not stop the electric energy compensation until electricity of the energy storage battery is completely discharged, but some electricity remains. An electric energy dispatch method of the present invention is described below by using a specific embodiment. Referring to FIG. 4, an electric energy dispatch method in another embodiment of the present invention includes the following.

401: An electric energy dispatch apparatus determines a first time period and a second time period.

For a detailed description, refer to the description of step 101 in the embodiment shown in FIG. 1.

402: The electric energy dispatch apparatus sends first indication information to the base station, where the first indication information is used to control an energy storage battery of the base station to store electric energy from a power grid connected to the base station within the first time period.

For a detailed description, refer to the description of step 102 in the embodiment shown in FIG. 1.

403: The electric energy dispatch apparatus sends second indication information to the base station, where the second indication information is used to control the energy storage battery of the base station to perform electric energy compensation for the power grid connected to the base station within the second time period.

For a detailed description, refer to the description of step 103 in the embodiment shown in FIG. 1.

404: When a status of the energy storage battery of the base station satisfies a third preset condition, the electric energy dispatch apparatus sends third indication information to the base station, where the third indication information is used to control the energy storage battery of the base station to stop performing electric energy compensation for the power grid.

At least within the second time period, the electric energy dispatch apparatus keeps monitoring the energy storage battery of the base station. When detecting that the status of the energy storage battery of the base station satisfies the third preset condition, the electric energy dispatch apparatus instructs the energy storage battery of the base station to stop performing electric energy compensation for the power grid. The third preset condition may be set in multiple manners. For example, to ensure normal running of the base station during power outage, a preset amount of electricity remains in the energy storage battery of the base station. When an amount of electric charge of the energy storage battery of the base station is less than the preset amount of electricity, it is determined that the status of the energy storage battery of the base station satisfies the third preset condition.

In actual application, the third preset condition may be determined in another manner. Specifically, for example, in this embodiment, the electric energy dispatch apparatus further acquires an amount of electric charge and a health coefficient of the energy storage battery of the base station, a service idleness coefficient of the base station, and a stability coefficient of the power grid connected to the base station.

The electric energy dispatch apparatus may acquire the data when entering the second time period or within a preset period before entering the second time period. The health coefficient of the energy storage battery of the base station may be acquired according to a state of health SOH of the energy storage battery. Specifically, for example, when the state of health SOH of the energy storage battery is greater than or equal to 70%, a value of the health coefficient of the energy storage battery is 1. When the state of health SOH of the energy storage battery is less than 70%, a value of the health coefficient of the energy storage battery is 0. Certainly, a correspondence between the state of health SOH of the energy storage battery and the value of the health coefficient may be another correspondence, which is not limited herein. Alternatively, the health coefficient of the energy storage battery may be determined by using another coefficient of the energy storage battery, which is not limited herein. Alternatively, in actual application, the health coefficient of the energy storage battery may be determined according to another parameter such as a voltage, a current, an internal resistance, or a battery temperature of the energy storage battery, which is not limited herein.

The service idleness coefficient of the base station may be acquired according to a load power ratio of the base station, where the load power ratio of the base station is a ratio of current load power of the base station to a load power upper limit of the base station. Specifically, for example, when the base station has a large amount of services, it is defined that the load power ratio of the base station is greater than or equal to 80%, and the value of the service idleness coefficient of the base station is 0. When the base station is has a normal amount of services, it is defined that the load power ratio of the base station is less than 80% and greater than 50%, and the value of the service idleness coefficient of the base station is 0.5. When the base station has a small amount of services, it is defined that the load power ratio of the base station is less than or equal to 50%, and the value of the service idleness coefficient of the base station is 1. Certainly, a correspondence between the load power ratio of the base station and the service idleness coefficient of the base station may be another correspondence, which is not limited herein.

The stability coefficient of the power grid connected to the base station may be acquired by using power-failure duration, within a working period of the base station, of the power grid. Specifically, for example, when a ratio of the power-failure duration, within a working period of the base station, of the power grid to the working period of the base station is greater than or equal to 50%, a value of the stability coefficient of the power grid is 0. When the ratio is less than 50% and greater than 25%, the value of the stability coefficient of the power grid is 0.5. When the ratio is less than or equal to 25%, the value of the stability coefficient of the power grid is 1. Certainly, a correspondence between the ratio of the power-failure duration, within the working period of the base station, of the power grid to the working period of the base station, and the stability coefficient of the power grid connected to the base station may be another correspondence, which is not limited herein. Alternatively, the stability coefficient of the power grid connected to the base station may be calculated according to another parameter such as a voltage, a current, or a power of the power grid, which is not limited herein.

After acquiring the amount of electric charge and the health coefficient of the energy storage battery of each base station, the service idleness coefficient of the base station, and the stability coefficient of the power grid connected to the base station, the electric energy dispatch apparatus calculates a discharge depth threshold of the energy storage battery of the base station according to the amount of electric charge of the energy storage battery and the three coefficients.

Specifically, for example, a product of the four values: the amount of electric charge and the health coefficient of the energy storage battery of each base station, the service idleness coefficient of the base station, and the stability coefficient of the power grid connected to the base station, may be used as the discharge depth threshold of the base station. Certainly, alternatively, in actual application, another operation may be performed on the four values, for example, a product of weighted values of the health coefficient of the energy storage battery of each base station, the service idleness coefficient of the base station, and the stability coefficient of the power grid connected to the base station may be calculated first, and then a product of the amount of electric charge of the energy storage battery of the base station and the product of the weighted values is used as the discharge depth threshold of the base station. The foregoing description of the calculation is merely an example, and is not limited.

To facilitate understanding, the electric energy dispatch method of this embodiment is described below by using an actual application scenario.

The electric energy dispatch apparatus acquires weekly predicted load data of the power grid from the power grid, where in daily predicted load data of the power grid, according to definitions of the peak-load time period and the low-load time period by the power grid, the electric energy dispatch apparatus determines that 22:00-6:00 every evening is the low-load time period of the power grid, and determines the low-load time period as the first time period. The electric energy dispatch apparatus determines that 10:00-12:00 every morning and 15:00-18:00 every afternoon are the peak-load time period of the power grid, and determines the peak-load time period as the second time period.

The electric energy dispatch apparatus simultaneously communicates with 20 base stations that are located in a same area, and detects states of respective energy storage batteries of the 20 base stations five minutes before the first time period (that is, 21:55 to 22:00 every day) and five minutes before the second time period (that is, 9:55 to 10:00 and 14:55 to 15:00 every day). When detecting that a status of an energy storage battery of each base station in the 20 base stations satisfies that an amount of electric charge within five minutes before the first time period is less than a first preset amount of electricity, the electric energy dispatch apparatus sends first indication information to the base station that satisfies the condition, where the first indication information is used to control an energy storage battery of the base station to store electric energy from a power grid connected to the base station within the first time period. When detecting that a status of an energy storage battery of each base station in the 20 base stations satisfies that an amount of electric charge within five minutes before the second time period is greater than a second preset amount of electricity, the electric energy dispatch apparatus sends second indication information to the base station that satisfies the condition, where the second indication information is used to control an energy storage battery of the base station to perform electric energy compensation for the power grid connected to the base station within the second time period.

Figure 5:
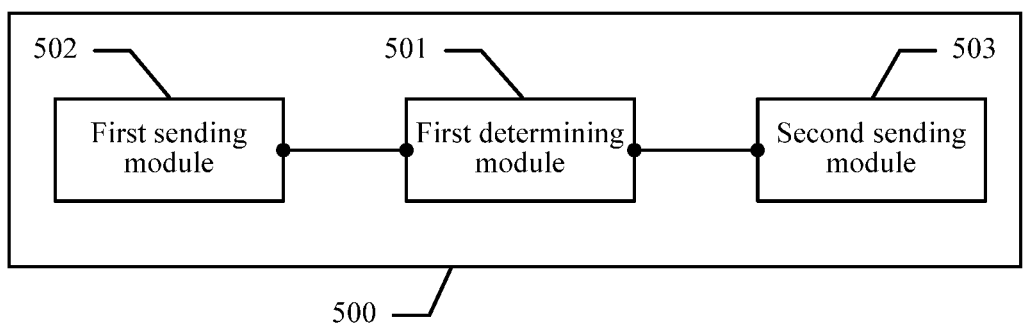
FIG. 5 is a schematic structural diagram of an embodiment of an electric energy dispatch apparatus according to the present invention.

The electric energy dispatch methods in the embodiments of the present invention are described above, and an electric energy dispatch apparatus in an embodiment of the present invention is described below. Referring to FIG. 5, an embodiment of an electric energy dispatch apparatus 500 of the present invention includes a first determining module 501, configured to determine a first time period and a second time period. A first sending module 502 is configured to send first indication information to at least one base station, where the first indication information is used to control an energy storage battery of the base station to store electric energy from a power grid connected to the base station within the first time period. A second sending module 503 is configured to send second indication information to the at least one base station, where the second indication information is used to control the energy storage battery of the base station to perform electric energy compensation for the power grid connected to the base station within the second time period.

In this embodiment of the present invention, the electric energy dispatch apparatus determines both a first time period and a second time period, uses an energy storage battery of at least one base station connected to the electric energy dispatch apparatus as an energy storage container within the first time period, transfers and stores electric energy of a power grid to the energy storage container, and uses the energy storage container to perform electric energy compensation within the second time period for the power grid. Because each existing base station is equipped with an energy storage battery, using the energy storage battery of each base station as an energy storage apparatus of a power grid does not need extra investment, and utilization value of the energy storage battery of the base station is improved. Moreover, efficiency of electric energy transfer between the power grid and the energy storage battery of each base station is relatively high, which avoids waste of electric energy due to relatively great loss of electric energy during a transfer process.

Figure 6:
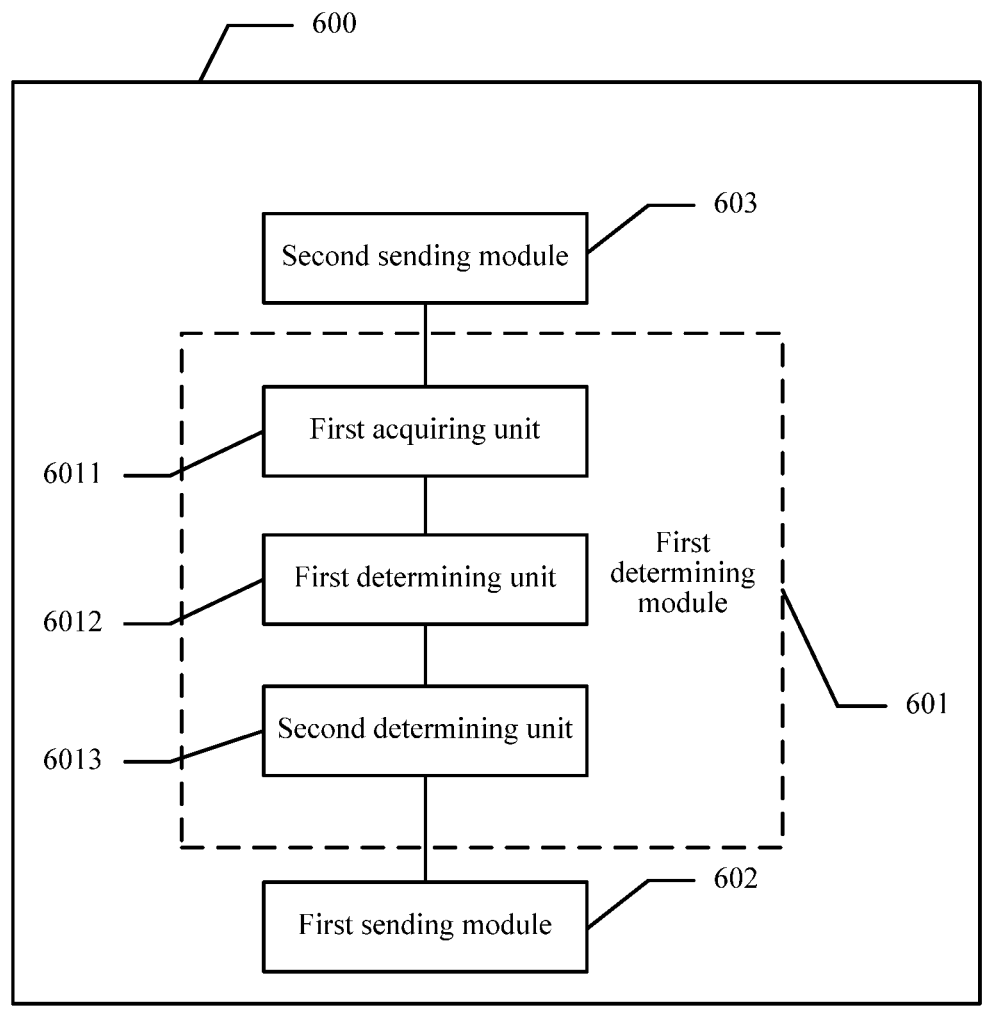
FIG. 6 is a schematic structural diagram of another embodiment of an electric energy dispatch apparatus according to the present invention.

In the foregoing embodiment, the electric energy dispatch apparatus needs to determine the first time period and the second time period. In actual application, the electric energy dispatch apparatus may determine the first time period and the second time period in multiple manners. An electric energy dispatch apparatus in an embodiment of the present invention is described below. Referring to FIG. 6, another embodiment of an electric energy dispatch apparatus 600 in the present invention includes a first determining module 601, configured to determine a first time period and a second time period. A first sending module 602 is configured to send first indication information to at least one base station. The first indication information is used to control an energy storage battery of the base station to store electric energy from a power grid connected to the base station within the first time period. A second sending module 603 is configured to send second indication information to the at least one base station, where the second indication information is used to control the energy storage battery of the base station to perform electric energy compensation for the power grid connected to the base station within the second time period.

In this embodiment of the present invention, the first determining module 601 specifically includes a first acquiring unit 6011 configured to acquire predicted load data of the power grid from the power grid. A first determining unit 6012 is configured to determine a low-load time period and a peak-load time period of the power grid according to the predicted load data of the power grid. A second determining unit 6013 is configured to determine the low-load time period of the power grid as the first time period, and determine the peak-load time period of the power grid as the second time period.

In this embodiment of the present invention, the electric energy dispatch apparatus acquires predicted load data of a power grid from the power grid, and determines, according to the data, that a time period within which an energy storage battery of each base station stores electric energy from the power grid is a low-load time period of the power grid, and that a time period within which the energy storage battery of each base station performs electric energy compensation for the power grid is a peak-load time period of the power grid. In this way, the electric energy dispatch apparatus uses an energy storage battery of at least one base station connected to the electric energy dispatch apparatus as an energy storage container, transfers and stores electric energy of the power grid to the energy storage container within the low-load time period of the power grid, so that the electric energy stored in the energy storage container can be used within the peak-load time period of the power grid, which can reduce pressure of the power grid within the peak-load time period and fully utilize electric energy resources within the low-load time period of the power grid.

In actual application, in this embodiment, alternatively, the first determining unit 601 may not include the foregoing units, but include a receiving unit (which is not shown in the figure), configured to receive and store presettings of the first time period and the second time period. The foregoing description of the first determining unit is merely an example, and is not limited.

Figure 7:
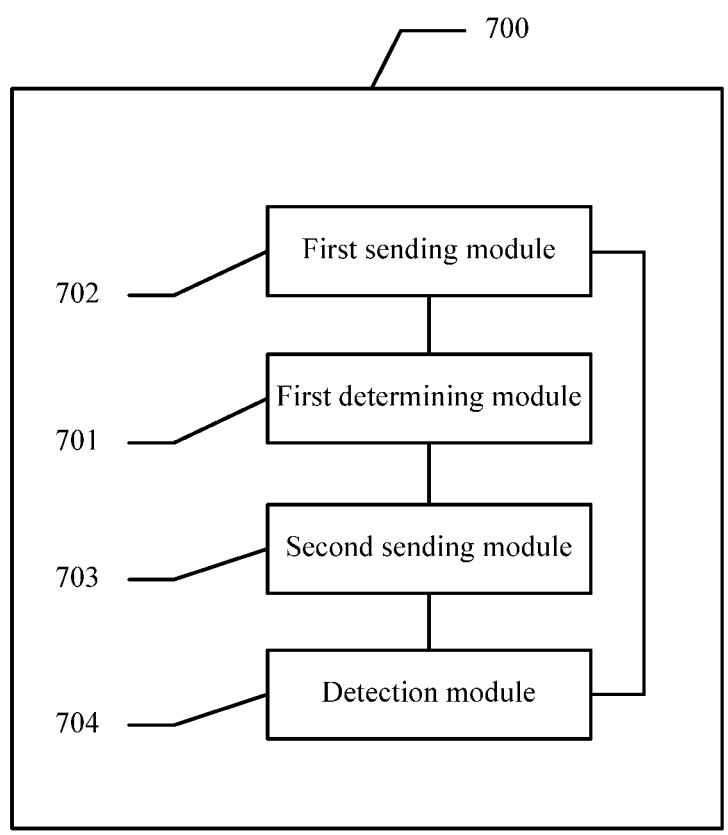
FIG. 7 is a schematic structural diagram of another embodiment of an electric energy dispatch apparatus according to the present invention.

In actual application, when the electric energy dispatch apparatus controls the energy storage battery of each base station to store electric energy from the power grid or perform electric energy compensation for the power grid, a status of the energy storage battery of each base station may be unfavorable for storing electric energy from the power grid or performing electric energy compensation for the power grid. Therefore, preferably, in an embodiment of the present invention, an electric energy dispatch apparatus further detects the status of the energy storage battery of each base station. An electric energy dispatch apparatus in an embodiment of the present invention is described below. Referring to FIG. 7, another embodiment of an electric energy dispatch apparatus in the present invention includes a first determining module 701 configured to determine a first time period and a second time period. A first sending module 702 is configured to send first indication information to at least one base station. The first indication information is used to control an energy storage battery of the base station to store electric energy from a power grid connected to the base station within the first time period. A second sending module 703 is configured to send second indication information to the at least one base station, where the second indication information is used to control the energy storage battery of the base station to perform electric energy compensation for the power grid connected to the base station within the second time period.

In this embodiment of the present invention, the electric energy dispatch apparatus further includes a detection module 704 configured to detect a status of an energy storage battery of each of the at least one base station. The first sending module 702 is specifically configured to: when a status of the energy storage battery of the base station before the first time period satisfies a first preset condition, send the first indication information to the base station. The second sending module 703 is specifically configured to: when a status of the energy storage battery of the base station before the second time period satisfies a second preset condition, send the second indication information to the base station.

In this embodiment of the present invention, the electric energy dispatch apparatus first detects a status of an energy storage battery of each base station, and when states of the energy storage battery of each base station before a first time period and a second time period respectively satisfy preset conditions, controls each energy storage battery to store electric energy and release electric energy, thereby ensuring safety working of the energy storage battery of each base station.

Preferably, in this embodiment, the first sending module 702 further includes a third determining unit (which is not shown in the figure), configured to: when an amount of electric charge of the energy storage battery of the base station before the first time period is less than a first preset value, determine that the status of the energy storage battery of the base station before the first time period satisfies the first preset condition.

Preferably, in this embodiment, the second sending module 703 further includes a fourth determining unit (which is not shown in the figure), configured to: when an amount of electric charge of the energy storage battery of the base station before the second time period is greater than a second preset value, determine that the status of the energy storage battery of the base station before the second time period satisfies the second preset condition.

Figure 8:
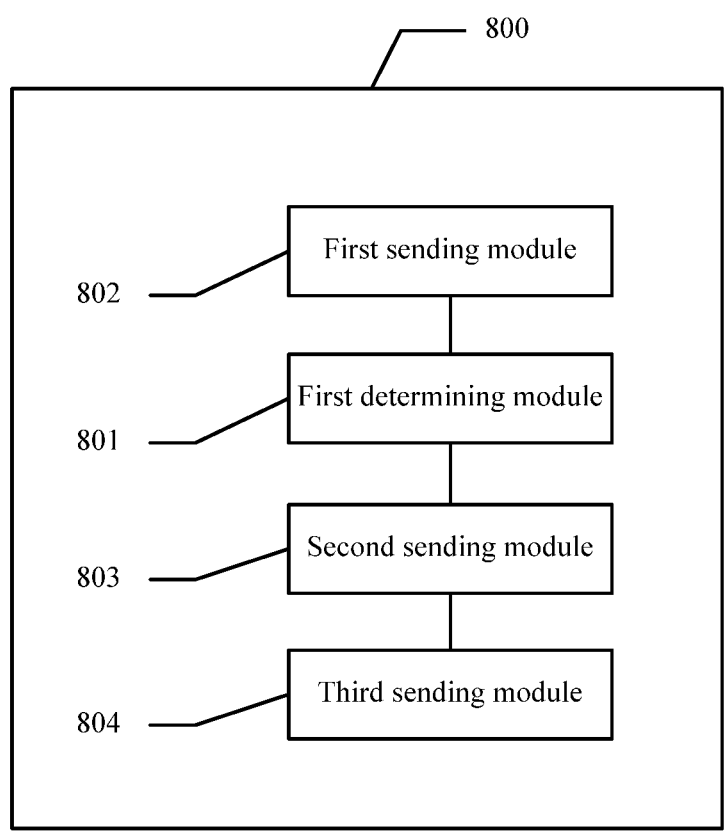
FIG. 8 is a schematic structural diagram of another embodiment of an electric energy dispatch apparatus according to the present invention.

In the foregoing embodiments, the electric energy dispatch apparatus sends second indication information to the base station, so as to control an energy storage battery of the base station to perform electric energy compensation within the second time period for the base station for the power grid. In actual application, to ensure that an energy storage battery of each base station can provide assurance to the base station during power outage, when the energy storage battery of each base station performs electric energy compensation within the second time period for the power grid, the energy storage battery does not stop the electric energy compensation until electricity of the energy storage battery is completely discharged, but some electricity remains. An electric energy dispatch apparatus of the present invention is described below by using a specific embodiment. Referring to FIG. 8, another embodiment of an electric energy dispatch apparatus in the present invention includes a first determining module 801 configured to determine a first time period and a second time period. A first sending module 802 is configured to send first indication information to at least one base station. The first indication information is used to control an energy storage battery of the base station to store electric energy from a power grid connected to the base station within the first time period. A second sending module 803 is configured to send second indication information to the at least one base station, where the second indication information is used to control the energy storage battery of the base station to perform electric energy compensation for the power grid connected to the base station within the second time period.

In this embodiment of the present invention, the electric energy dispatch apparatus further includes a third sending module 804, configured to: after the second sending module 803 sends the second indication information to the base station, send third indication information to the base station when a status of the energy storage battery of the base station satisfies a third preset condition, where the third indication information is used to control the energy storage battery of the base station to stop performing electric energy compensation for the power grid.

Further, preferably, the electric energy dispatch apparatus further includes an acquiring module (which is not shown in the figure), configured to acquire an amount of electric charge and a health coefficient of the energy storage battery of the base station, a service idleness coefficient of the base station, and a stability coefficient of the power grid connected to the base station. A calculation module (which is not shown in the figure), configured to calculate a discharge depth threshold of the energy storage battery of the base station according to the amount of electric charge and the health coefficient of the energy storage battery of the base station, the service idleness coefficient of the base station, and the stability coefficient of the power grid connected to the base station. A second determining module (which is not shown in the figure), configured to: when a discharge depth of an energy storage battery of each of the base stations reaches the discharge depth threshold, determine, by the electric energy dispatch apparatus, that the status of the energy storage battery of the base station satisfies the third preset condition.

Figure 9:
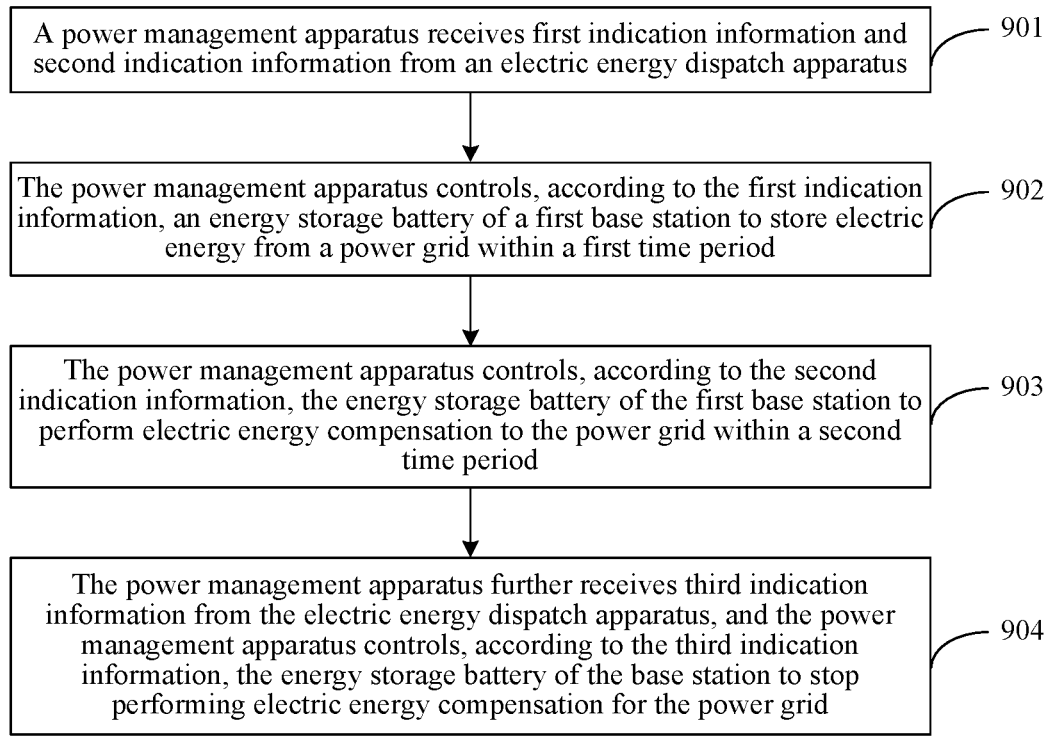
FIG. 9 is a flowchart of an embodiment of a power management method according to the present invention.

The electric energy dispatch methods and the electric energy dispatch apparatuses in the embodiments of the present invention are described above, and a power management method in the embodiments of the present invention is described below. Referring to FIG. 9, an embodiment of a power management method of the present invention includes the following.

901: A power management apparatus receives first indication information and second indication information from an electric energy dispatch apparatus.

In a communications system, each base station is equipped with an energy storage battery, where the energy storage battery is used to: supply power to the base station during power outage, so as to ensure normal running of the base station, and when power is normally supplied to the base station, store electric energy from a power grid connected to the base station, so as to supply electric energy to the base station during next power outage. Moreover, each base station is equipped with a power management apparatus, and the power management apparatus is connected to the energy storage battery in the base station. The power management apparatus is configured to receive indication information from the electric energy dispatch apparatus, and controls, according to the indication information, the energy storage battery of the base station to store electric energy from a power grid and to perform electric energy compensation for the power grid.

902: The power management apparatus controls, according to the first indication information, an energy storage battery of the first base station to store electric energy within a first time period from the power grid.

When receiving the first indication information from the electric energy dispatch apparatus, the power management apparatus controls the connected energy storage battery to store electric energy within the first time period.

903: The power management apparatus controls, according to the second indication information, the energy storage battery of the first base station to perform electric energy compensation within a second time period for the power grid.

When receiving the second indication information from the electric energy dispatch apparatus, the power management apparatus controls the connected energy storage battery to perform electric energy compensation for the power grid.

In this embodiment of the present invention, a power management apparatus in a base station stores electric energy into an energy storage battery and performs electric energy compensation for a power grid respectively within a first time period and a second time period according to indications received from an electric energy dispatch apparatus. In this way, an energy storage battery of a base station may be used as an energy storage apparatus of a power grid, and no extra costs need to be input to dispose the energy storage apparatus of the power grid. Moreover, efficiency of electric energy transfer between the power grid and an energy storage battery of each base station is relatively high, which avoids waste of electric energy due to relatively great loss of electric energy during a transfer process.

In this embodiment, the power management apparatus receives the second indication information from the electric energy dispatch apparatus, and controls the energy storage battery of the first base station to perform electric energy compensation within the second time period for the base station for the power grid. In actual application, to ensure that the energy storage battery of the first base station can provide assurance to the base station during power outage, when the energy storage battery of the first base station performs electric energy compensation within the second time period for the power grid, and the energy storage battery does not stop the electric energy compensation until electricity of the energy storage battery is completely discharged, but some electricity remains.

Therefore, preferably, the power management method of this embodiment further includes the following steps.

904: The power management apparatus further receives third indication information from the electric energy dispatch apparatus, and the power management apparatus controls, according to the third indication information, the energy storage battery of the first base station to stop performing electric energy compensation for the power grid.

When receiving the third indication information from the electric energy dispatch apparatus, the power management apparatus controls the energy storage battery of the first base station to immediately stop performing electric energy compensation for the power grid.

To help the electric energy dispatch apparatus determine, according to an actual situation of the base station, conditions for the base station to store electric energy and to perform electric energy compensation for the power grid, preferably, in the power management method of this embodiment, the power management apparatus of each base station further detects in real time, load power of the base station, a related parameter of the power grid connected to the base station, and a related parameter of the energy storage battery of the base station, and sends the data to the electric energy dispatch apparatus. The related parameter of the power grid may include at least one of a voltage, a current, a power, or a power supply time; and the related parameter of the energy storage battery of the base station may include at least one of a voltage, a current, an internal resistance, an amount of electric charge, or a battery temperature of the energy storage battery. In this way, the electric energy dispatch apparatus may determine, according to the data, conditions for the energy storage battery of each base station to store electric energy from the power grid and to perform electric energy compensation for the power grid, so that the determined conditions conform to an actual situation of each base station.

Figure 10:
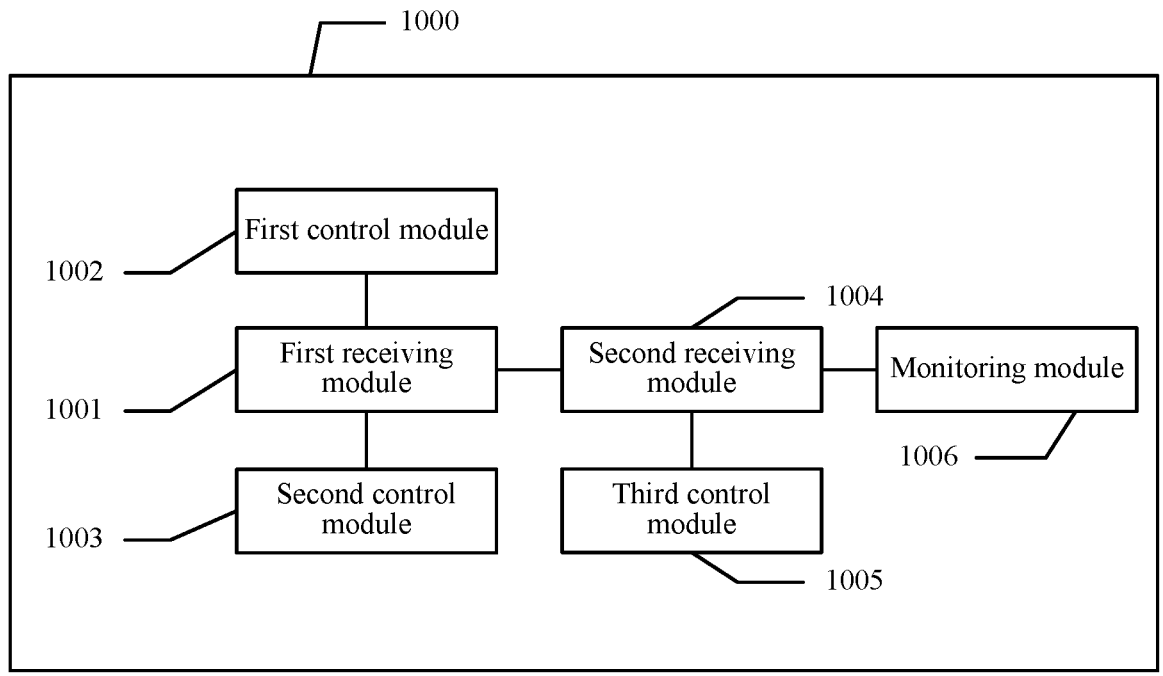
FIG. 10 is a schematic structural diagram of an embodiment of a power management apparatus according to the present invention.

The power management method in the embodiments of the present invention is described above, and a power management apparatus in the embodiments of the present invention is described below. Referring to FIG. 10, an embodiment of a power management apparatus 1000 of the present invention includes a first receiving module 1001 configured to receive first indication information and second indication information from an electric energy dispatch apparatus. A first control module 1002 is configured to control, according to the first indication information, an energy storage battery of the first base station to store electric energy within a first time period from a power grid connected to the first base station. A second control module

1003 is configured to control, according to the second indication information, the energy storage battery of the first base station to perform electric energy compensation within a second time period for the power grid connected to the first base station.

In this embodiment of the present invention, the power management apparatus in a base station stores electric energy into an energy storage battery and performs electric energy compensation for a power grid respectively within a first time period and a second time period according to indications received from an electric energy dispatch apparatus. In this way, an energy storage battery of a base station may be used as an energy storage apparatus of a power grid, and no extra costs need to be input to dispose the energy storage apparatus of the power grid. Moreover, efficiency of electric energy transfer between the power grid and an energy storage battery of each base station is relatively high, which avoids waste of electric energy due to relatively great loss of electric energy during a transfer process.

Preferably, in this embodiment, the power management apparatus further includes a second receiving module 1004, configured to receive third indication information from the electric energy dispatch apparatus; and further includes a third control module 1005, configured to control, according to the third indication information, the energy storage battery of the first base station to stop performing electric energy compensation for the power grid.

In this way, when the energy storage battery of the first base station performs electric energy compensation within the second time period for the power grid, the electric energy compensation does not stop until electricity of the energy storage battery is completely discharged, but some electricity remains, to ensure that the energy storage battery of the first base station can provide assurance to the base station during power outage.

To help the electric energy dispatch apparatus determine, according to an actual situation of the base station, conditions for the base station to store electric energy and to perform electric energy compensation for the power grid, preferably, the power management apparatus in this embodiment further includes a monitoring module 1006 configured to monitor in real time load power of the first base station, a related parameter of the power grid connected to the first base station, and a related parameter of the energy storage battery of the first base station, and send the load power of the first base station, the related parameter of the power grid connected to the first base station, and the related parameter of the energy storage battery of the first base station to the electric energy dispatch apparatus.

The electric energy dispatch apparatuses and the power management apparatus in the embodiments of the present invention are described above. In the foregoing embodiments, the electric energy dispatch apparatus manages an energy storage battery of at least one base station. In a case in which the electric energy dispatch apparatus manages an energy storage battery of only one base station, an electric energy dispatch apparatus corresponding to each base station may be integrated together with a power management apparatus of the base station. Certainly, the foregoing description is merely an example, and is not limited.

Figure 11:
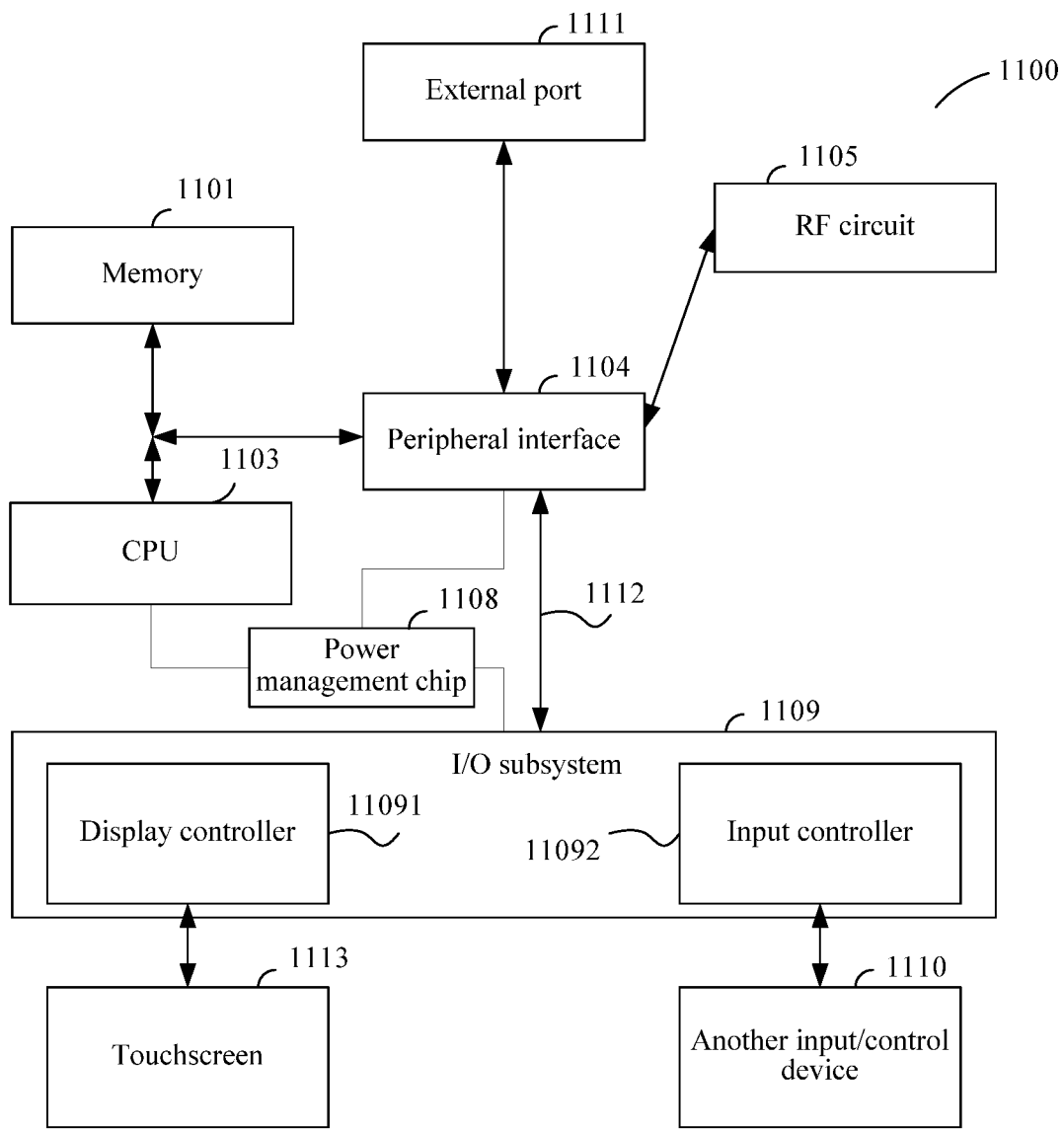
FIG. 11 is a schematic diagram of an electric energy dispatch platform according to an embodiment of the present invention.

The electric energy dispatch apparatuses in the embodiments of the present invention are described above from the perspective of a modular and functional entity, and the electric energy dispatch apparatuses in the embodiments of the present invention are described below from the perspective of hardware processing. Referring to FIG. 11, the present invention is specifically described by using an electric energy dispatch platform as an example.

It should be understood that, an electric energy dispatch platform 1100 shown in the figure is merely an example of the electric energy dispatch apparatus, and the electric energy dispatch apparatus 1100 may include more components or fewer components than those shown in the figure, two or more components may be combined, or a different component configuration may be used. The components shown in the figure may be implemented in hardware, software, or a combination of hardware and software that includes one or more signal processing and/or application-specific integrated circuits.

As shown in FIG. 11, the electric energy dispatch platform includes a memory 1101, a central processing unit (CPU) 1103, a peripheral interface 1104, an RF circuit 1105, a power management chip 1108, an input/output (I/O) subsystem 1109, another input/control device 1110, and an external port 1111, and these components performs communication by using one or more communications buses or signal cables 1112.

It should be noted that, the electric energy dispatch platform provided in this embodiment is merely an example of a mobile terminal, the mobile terminal involved in this embodiment of the present invention may include more or fewer components than those shown in FIG. 11, two or more components may be combined, or different configurations or settings of the components may be used. The components may be implemented in hardware, software, or a combination of hardware and software that includes one or more signal processing and/or application-specific integrated circuits.

The electric energy dispatch platform that is provided in this embodiment and that is used for processing a message is described below in detail.

The memory 1101: The memory 1101 may be accessed by the CPU 1103, the peripheral interface 1104, and the like. The memory 1101 may include a high-speed random access memory, or may include a nonvolatile memory, for example, one or more magnetic disk storage devices, flash memories, or other nonvolatile solid-state memories.

The peripheral interface 1104: The peripheral interface may connect input and output peripherals of a device to the CPU 1103 and the memory 1101.

The I/O subsystem 1109: The I/O subsystem 1109 may connect the input and output peripherals on the device, for example, a touchscreen 1113 (equivalent to a display in the foregoing embodiment) and the another input/control device 1110, to the peripheral interface 1104. The I/O subsystem 1109 may include a display controller 11091 and one or more input controllers 11092 for controlling the another input/control device 1110. The one or more input controllers 11092 receive an electrical signal from the another input/control device 1110 or send an electrical signal to the another input/control device 1110, where the another input/control device 1110 may include a physical button (a press button, a rocker button, or the like), a dial, a slide switch, a joystick, or an a click scroll wheel. It should be noted that, the input controller 11092 may be connected to any one of the following: a keyboard, an infrared port, a USB interface, and a pointing device such as a mouse.

The touchscreen 1113: The touchscreen 1113 serves as an input interface and an output interface between the mobile terminal and the user, and displays an visible output to the user, where the visible output may include a picture, text, an icon, a video, and the like.

The display controller 11091 in the I/O subsystem 1109 receives an electrical signal from the touchscreen 1113 or sends an electrical signal to the touchscreen 1113. The touchscreen 1113 detects a touch on the touchscreen; the display controller 11091 converts the detected touch into an interaction with a user interface object displayed on the touchscreen 1113, that is, a human-computer interaction, where the user interface object displayed on the touchscreen 1113 may be a game running icon, an icon linked to a corresponding network, or the like. It should be noted that, the device may further include an optical mouse, where the optical mouse is a touch-sensitive surface that does not display a visible output, or an extension of a touch-sensitive surface formed by a touchscreen.

The RF circuit 1105 is mainly configured to establish communication between the electric energy dispatch platform and a wireless network (that is, a network side), to implement data receiving and sending between the electric energy dispatch platform and the wireless network. Specifically, the RF circuit 1105 receives and sends an RF signal, where the RF signal is also referred to as an electromagnetic signal; the RF circuit 1105 converts an electrical signal into an electromagnetic signal or converts an electromagnetic signal into an electrical signal, and communicates with a communications network and another device by using the electromagnetic signal. The RF circuit 1105 may include a known circuit for performing these functions, which includes but is not limited to an antenna system, an RF transceiver, one or more amplifiers, a tuner, one or more oscillators, a digital signal processor, a CODEC chip set, a subscriber identity module (SIM), and the like.

The power management chip 1108 is configured to supply power to and perform power management on hardware connected to the CPU 1103, the I/O subsystem, and the peripheral interface. In actual application, alternatively, the power management chip 1108 may be integrated into one module together with the CPU 1103 or another component.

Figure 12:
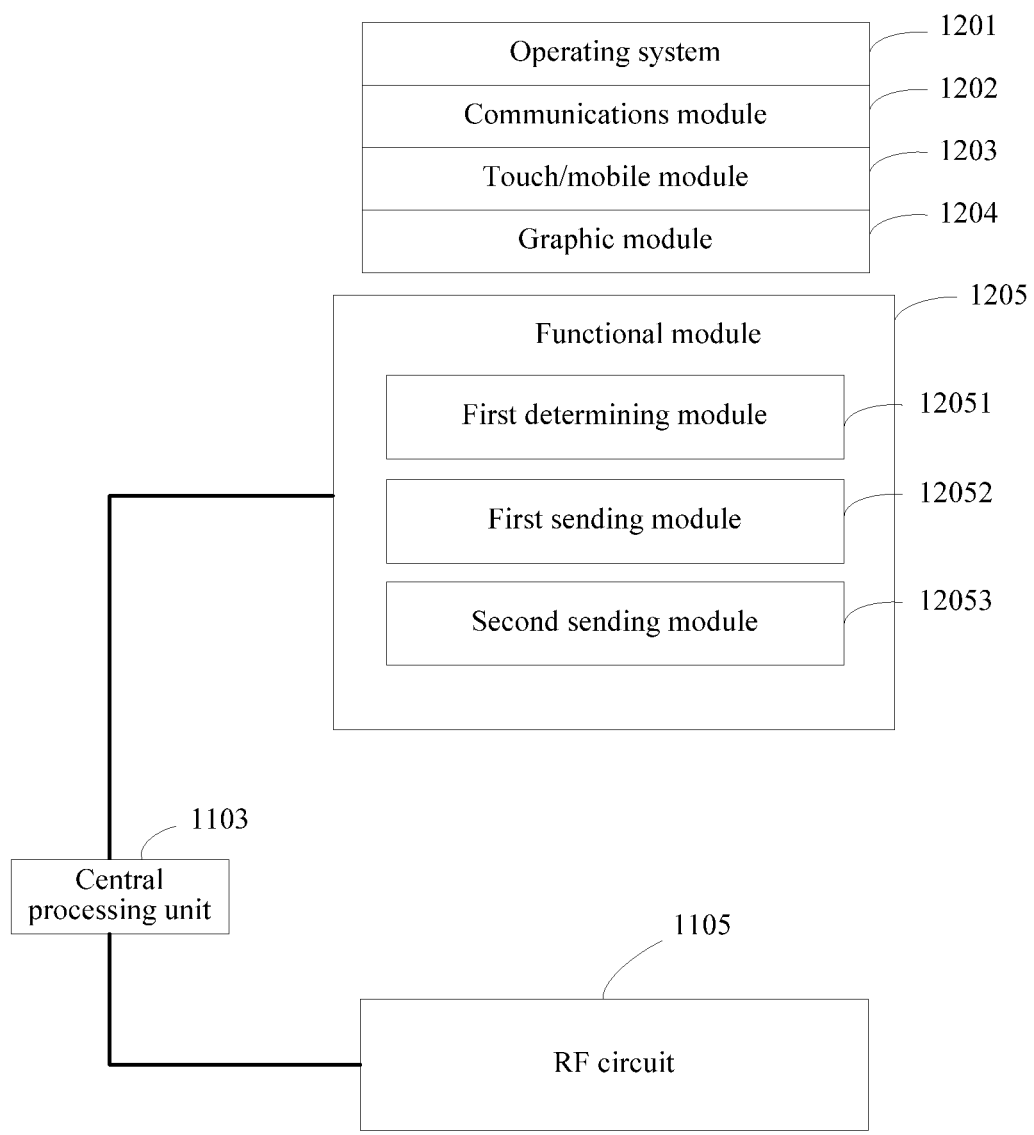
FIG. 12 is a structural diagram of an inner part of the electric energy dispatch platform according to an embodiment of the present invention.

FIG. 12 is a structural diagram of an inner part of the electric energy dispatch platform. In this embodiment of the present invention, a software component stored in the memory 1101 may include an operating system 1201, a communications module 1202, a touch/mobile module 1203, a graphic module 1204, and a functional module 1205.

The operating system 1201 (for example, Darwin, RTXC, LINUX, UNIX, OS X, WINDOWS, or an embedded operating system such as VxWorks) includes various software components and/or drivers for controlling and managing common system tasks (for example, memory management, control over a storage device, and power management), and facilitates communication between various hardware and software components.

The communications module 1202 is configured to communication with another device by using one or more external ports 1111, and further includes various software components for processing data received by the RF circuit 1105 and/or the external port 1111.

The touch/mobile module 1203 may detect a touch on the touchscreen 1113 (combined with the display controller 11091) and another touch-sensitive device (for example, a touch pad or a physical click scroll wheel). The touch/mobile module 1203 includes various software components for performing various operations related to detecting a touch, where the operations are, for example, determining whether a touch occurs, determining whether the touch moves and tracing the movement on the touchscreen 1113, and determining whether the touch has been discontinued (that is, whether the touch has been stopped). Determining a movement of a touch point may include: determining a rate (an amplitude value), a speed (an amplitude value and a direction), and/or an acceleration (a change in the amplitude value and/or the direction) of the touch point. These operations may be applied to a single touch (for example, a touch with one finger) or applied to multiple simultaneous touches (for example, "touches at multiple points"/touches with multiple fingers). In some embodiments, the touch/mobile module 1203 and the display controller 11091 further detect a touch on a touch pad.

The graphic module 1204 includes various known software components for displaying an image on the touchscreen 1113, including a component for changing luminosity of the displayed picture, for example, a graphical user interface that receives an instruction from the central processing unit 1103 and that displays various types of software on the touchscreen 1113.

The functional module 1205 may specifically include a first determining module 12051, configured to determine a first time period and a second time period. A first sending module 12052 is configured to send first indication information to at least one base station. The first indication information is used to control an energy storage battery of the base station to store electric energy from a power grid connected to the base station within the first time period. A second sending module 12053 is configured to send second indication information to the at least one base station. The second indication information is used to control the energy storage battery of the base station to perform electric energy compensation for the power grid connected to the base station within the second time period.

The RF circuit 1105 receives information sent by the network side or another device, where the message may be specifically communications information in the foregoing embodiments. It may be understood that, the received message may be information of another type, which is not limited in this embodiment of the present invention. Persons skilled in the art may know that the received information may carry data of multiple data types. There may be data of only one data type, or there may be data of two or more data types.

The central processing unit 1103 identifies a data type of data in the information received by the RF circuit 1105; and stores, according to a correspondence list, the data to a functional module corresponding to the data type of the data, where the correspondence list is a list showing a correspondence between a data type and a functional module. The functional module 1205 may specifically include a first determining module 12051, a first sending module 12052, and a second sending module 12053. It may be understood that, in this embodiment of the present invention, a manner in which the central processing unit 1103 identifies data of various formats may be the manner in the foregoing embodiment, and details are not described herein again.

Specifically, the first determining module includes: a first acquiring unit, configured to acquire predicted load data of the power grid from the power grid; a first determining unit, configured to determine a low-load time period and a peak-load time period of the power grid according to the predicted load data of the power grid; and a second determining unit, configured to determine the low-load time period of the power grid as the first time period, and determine the peak-load time period of the power grid as the second time period.

Specifically, the first determining module includes: a receiving unit, configured to receive and store presettings of the first time period and the second time period.

Specifically, the functional module 1205 further includes: a detection module, configured to detect a status of an energy storage battery of each of the at least one base station, where the first sending module is specifically configured to: when a status of the energy storage battery of the base station before the first time period satisfies a first preset condition, send the first indication information to the base station; and the second sending module is specifically configured to: when a status of the energy storage battery of the base station before the second time period satisfies a second preset condition, send the second indication information to the base station.

Specifically, the first sending module further includes a third determining unit, configured to: when an amount of electric charge of the energy storage battery of the base station before the first time period is less than a first preset value, determine that the status of the energy storage battery of the base station before the first time period satisfies the first preset condition.

Specifically, the second sending module further includes a fourth determining unit, configured to: when an amount of electric charge of the energy storage battery of the base station before the second time period is greater than a second preset value, determine that the status of the energy storage battery of the base station before the second time period satisfies the second preset condition.

Specifically, the functional module 1205 further includes a third sending module, configured to: after the second sending module sends the second indication information to the base station, send third indication information to the base station when a status of the energy storage battery of the base station satisfies a third preset condition, where the third indication information is used to control the energy storage battery of the base station to stop performing electric energy compensation for the power grid.

Specifically, the functional module 1205 further includes an acquiring module, configured to acquire an amount of electric charge and a health coefficient of the energy storage battery of the base station, a service idleness coefficient of the base station, and a stability coefficient of the power grid connected to the base station; a calculation module, configured to calculate a discharge depth threshold of the energy storage battery of the base station according to the amount of electric charge and the health coefficient of the energy storage battery of the base station, the service idleness coefficient of the base station, and the stability coefficient of the power grid connected to the base station; and a second determining module, configured to: when a discharge depth of an energy storage battery of each of the base stations reaches the discharge depth threshold, determine, by the electric energy dispatch apparatus, that the status of the energy storage battery of the base station satisfies the third preset condition.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method comprising:
   determining, by an electric energy dispatch apparatus, a first time period and a second time period;
   sending, by the electric energy dispatch apparatus, first indication information to a base station, wherein sending the first indication information causes an energy storage battery of the base station to store electric energy from a power grid connected to the base station within the first time period;
   sending, by the electric energy dispatch apparatus, second indication information to the base station, wherein sending the second indication information causes the energy storage battery to perform electric energy compensation for the power grid within the second time period; and
   sending, by the electric energy dispatch apparatus, third indication information to the base station, wherein sending the third indication information causes the energy storage battery to stop performing electric energy compensation for the power grid, and wherein the third indication information indicates that a discharge depth of the energy storage battery has reached a discharge depth threshold, the discharge depth threshold being calculated according to a service idleness coefficient of the base station.

2. The method according to claim 1, wherein determining the first time period and the second time period comprises:
acquiring, by the electric energy dispatch apparatus, predicted load data of the power grid from the power grid;
determining, by the electric energy dispatch apparatus, a low-load time period and a peak-load time period of the power grid according to the predicted load data of the power grid; and
determining, by the electric energy dispatch apparatus, the low-load time period of the power grid as the first time period, and determining the peak-load time period of the power grid as the second time period.

3. The method according to claim 1, wherein determining the first time period and the second time period comprises:
receiving and storing, by the electric energy dispatch apparatus, presettings of the first time period and the second time period.

4. The method according to claim 1, further comprising:
detecting, by the electric energy dispatch apparatus, a status of the energy storage battery,
wherein sending the first indication information comprises:
when a first status of the energy storage battery before the first time period satisfies a first preset condition, sending, by the electric energy dispatch apparatus, the first indication information to the base station; and
wherein sending the second indication information comprises:
when a second status of the energy storage battery before the second time period satisfies a second preset condition, sending, by the electric energy dispatch apparatus, the second indication information to the base station.

5. The method according to claim 4, wherein sending the first indication information further comprises:
determining that the first preset condition is satisfied when an amount of electric charge of the energy storage battery before the first time period is less than a first preset value.

6. The method according to claim 4, wherein sending the second indication information further comprises:
determining that the second preset condition is satisfied when an amount of electric charge of the energy storage battery before the second time period is greater than a second preset value.

7. The method according to claim 1, wherein sending the third indication information comprises:
after sending the second indication information to the base station, and when a status of the energy storage battery satisfies a third preset condition, sending, by the electric energy dispatch apparatus, the third indication information to the base station.

8. The method according to claim 7, further comprising:
acquiring, by the electric energy dispatch apparatus, an amount of electric charge of the energy storage battery, a health coefficient of the energy storage battery, the service idleness coefficient of the base station, and a stability coefficient of the power grid;
calculating, by the electric energy dispatch apparatus, the discharge depth threshold of the energy storage battery according to the amount of electric charge, the health coefficient, the service idleness coefficient, and the stability coefficient; and
when the discharge depth of the energy storage battery reaches the discharge depth threshold, determining, by the electric energy dispatch apparatus, that the status of the energy storage battery satisfies the third preset condition.

9. An apparatus comprising:
a processor;
a non-transitory computer-readable storage medium storing a program to be executed by the processor, the program comprising instructions to:
determine a first time period and a second time period;
send first indication information to a base station, wherein sending the first indication information causes an energy storage battery of the base station to store electric energy from a power grid connected to the base station within the first time period;
send second indication information to the base station, wherein sending the second indication information causes the energy storage battery to perform electric energy compensation for the power grid within the second time period; and
send third indication information to the base station, wherein sending the third indication information causes control the energy storage battery to stop performing electric energy compensation for the power grid, and wherein the third indication information indicates that a discharge depth of the energy storage battery has reached a discharge depth threshold, the discharge depth threshold being calculated according to a service idleness coefficient of the base station.

10. The apparatus according to claim 9, wherein instructions to determine the first time period and the second time period further comprise instructions to:
acquire predicted load data of the power grid from the power grid;
determine a low-load time period and a peak-load time period of the power grid according to the predicted load data of the power grid; and
determine the low-load time period of the power grid as the first time period, and determine the peak-load time period of the power grid as the second time period.

11. The apparatus according to claim 9, wherein instructions to determine the first time period and the second time period further comprise instructions to:
receive and store presettings of the first time period and the second time period.

12. The apparatus according to claim 9, wherein the program further comprises instructions to:
detect status of the energy storage battery,
wherein instructions to send the first indication information further comprise instructions to: when a first status of the energy storage battery before the first time period satisfies a first preset condition, send the first indication information to the base station; and
wherein instructions to send the second indication information further comprise instructions to: when a second status of the energy storage battery before the second time period satisfies a second preset condition, send the second indication information to the base station.

13. The apparatus according to claim 12, wherein instructions to send the first indication information further comprise instructions to:

determine that the first preset condition is satisfied when an amount of electric charge of the energy storage battery before the first time period is less than a first preset value.

14. The apparatus according to claim 12, wherein instructions to send the second indication information further comprise instructions to:
determine that the second preset condition is satisfied when an amount of electric charge of the energy storage battery before the second time period is greater than a second preset value.

15. The apparatus according to claim 9, wherein instructions to send the third indication information further comprise instructions to:
after sending the second indication information to the base station, send third indication information to the base station when a status of the energy storage battery satisfies a third preset condition.

16. The apparatus according to claim 15, wherein the program further comprises instructions to:
acquire an amount of electric charge of the energy storage battery, a health coefficient of the energy storage battery, the service idleness coefficient of the base station, and a stability coefficient of the power grid;
calculate the discharge depth threshold of the energy storage battery according to the amount of electric charge, the health coefficient, the service idleness coefficient, and the stability coefficient; and
when the discharge depth of the energy storage battery of the base station reaches the discharge depth threshold, determine that the status of the energy storage battery satisfies the third preset condition.

17. A method comprising:
receiving, by a power management apparatus, first indication information, second indication information, and third indication information from an electric energy dispatch apparatus;
controlling, by the power management apparatus according to the first indication information, an energy storage battery of a base station to store electric energy within a first time period from a power grid connected to the base station;
controlling, by the power management apparatus according to the second indication information, the energy storage battery to perform electric energy compensation within a second time period for the power grid; and
controlling, by the power management apparatus according to the third indication information, the energy storage battery to stop performing electric energy compensation for the power grid, wherein the third indication information indicates that a discharge depth of the energy storage battery has reached a discharge depth threshold, the discharge depth threshold being calculated according to a service idleness coefficient of the base station.

18. The method according to claim 17, further comprising:
monitoring in real time, by the power management apparatus, load power of the base station, a first related parameter of the power grid, and a second related parameter of the energy storage battery, and sending the load power of the base station, the first related parameter of the power grid, and the second related parameter of the energy storage battery to the electric energy dispatch apparatus.

19. The method according to claim 17, wherein receiving the third indication information comprises:
receiving, by the power management apparatus and from the electric energy dispatch apparatus, the third indication information in response to a determination that a status of the energy storage battery satisfies a third preset condition when the discharge depth of the energy storage battery reaches the discharge depth threshold, wherein the discharge depth threshold is calculated according to an amount of electric charge of the energy storage battery, a health coefficient of the energy storage battery, the service idleness coefficient of the base station, and a stability coefficient of the power grid.

20. A power management apparatus of a base station comprising:
a processor;
a non-transitory computer-readable storage medium storing a program to be executed by the processor, the program comprising instructions to:
receive first indication information, second indication information, and third indication information from an electric energy dispatch apparatus;
control, according to the first indication information, an energy storage battery of the base station to store electric energy within a first time period from a power grid connected to the base station;
control, according to the second indication information, the energy storage battery to perform electric energy compensation within a second time period for the power grid; and
control, according to the third indication information, the energy storage battery to stop performing electric energy compensation for the power grid, wherein the third indication information indicates that a discharge depth of the energy storage battery has reached a discharge depth threshold, the discharge depth threshold being calculated according to a service idleness coefficient of the base station.

21. The power management apparatus of the base station according to claim 20, wherein the program further comprises instructions to:
monitor in real-time a load power of the base station, a first related parameter of the power grid, and a second related parameter of the energy storage battery, and
send the load power of the base station, the first related parameter of the power grid, and the second related parameter of the energy storage battery to the electric energy dispatch apparatus.

22. The power management apparatus of the base station according to claim 20, wherein instructions to receive the third indication information further comprise instructions to:
receive, from the electric energy dispatch apparatus, the third indication information in response to a determination that a status of the energy storage battery satisfies a third preset condition when the discharge depth of the energy storage battery reaches the discharge depth threshold, wherein the discharge depth threshold is calculated according to an amount of electric charge of the energy storage battery, a health coefficient of the energy storage battery, the service idleness coefficient of the base station, and a stability coefficient of the power grid.

* * * * *